(12) United States Patent
Yen et al.

(10) Patent No.: US 10,190,724 B2
(45) Date of Patent: Jan. 29, 2019

(54) SUPPORTING FRAME

(71) Applicant: SYNCMOLD ENTERPRISE CORP., New Taipei (TW)

(72) Inventors: Ching-Hui Yen, New Taipei (TW); Chien-Cheng Yeh, New Taipei (TW); Chin-Chuan Lu, New Taipei (TW); Yi-Xin Lee, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 15/936,976

(22) Filed: Mar. 27, 2018

(65) Prior Publication Data

US 2018/0356023 A1  Dec. 13, 2018

Related U.S. Application Data

(60) Provisional application No. 62/517,385, filed on Jun. 9, 2017.

(30) Foreign Application Priority Data

Dec. 6, 2017 (TW) .............................. 106218102 U

(51) Int. Cl.
*F16M 11/00* (2006.01)
*F16M 11/10* (2006.01)

(52) U.S. Cl.
CPC ....... *F16M 11/10* (2013.01); *F16M 2200/022* (2013.01); *F16M 2200/041* (2013.01); *F16M 2200/063* (2013.01)

(58) Field of Classification Search
USPC .................................................. 248/123.11
See application file for complete search history.

(56) References Cited

U.S. PATENT DOCUMENTS

| | | | | |
|---|---|---|---|---|
| 4,682,749 A * | 7/1987 | Strater | ................... | A47B 27/18 188/166 |
| 7,252,277 B2 * | 8/2007 | Sweere | ................ | F16M 11/105 248/284.1 |
| 7,584,933 B2 * | 9/2009 | Chih | ...................... | F16M 11/10 248/176.1 |
| 7,637,463 B2 * | 12/2009 | Yen | .................... | F16M 11/2014 248/123.11 |
| 7,810,773 B2 * | 10/2010 | Chi | .................... | F16M 11/2064 248/121 |
| 8,570,723 B2 * | 10/2013 | Myerchin | ............ | F16M 11/046 248/125.2 |
| 8,672,277 B2 * | 3/2014 | Hsu | ........................ | F16M 11/10 248/121 |

(Continued)

*Primary Examiner* — Monica E Millner
(74) *Attorney, Agent, or Firm* — Muncy, Geissler, Olds & Lowe, P.C.

(57) ABSTRACT

A supporting frame is disclosed, which comprises a base, a shaft, a cantilever arm, an elastic body, a mounting unit and at least one cam. The shaft is disposed on the base. The cantilever arm has a first end and a second end. The cam is formed on the first end. The first end of the cantilever arm is pivoted on the shaft, and the elastic body is sleeved on the shaft for providing an elastic force to the cam. The mounting unit holds the display device. The cantilever arm rotates toward the base around a pivot point where the shaft is pivoted on the cantilever arm to cause the cam deforming the elastic body so that elastic force of the elastic body is increased.

11 Claims, 5 Drawing Sheets

(56) References Cited

U.S. PATENT DOCUMENTS

| | | | |
|---|---|---|---|
| 8,689,646 B2* | 4/2014 | Carr | B66D 1/02 |
| | | | 73/862.61 |
| 8,794,579 B2* | 8/2014 | Sturman | F16M 11/105 |
| | | | 248/284.1 |
| 9,004,431 B2* | 4/2015 | Huang | F16M 11/10 |
| | | | 248/121 |
| 2012/0119040 A1* | 5/2012 | Ergun | A47B 21/02 |
| | | | 248/126 |

* cited by examiner

SUPPORTING FRAME

CROSS REFERENCE TO RELATED APPLICATION

This application claims the benefit of U.S. Provisional Application Ser. No. 62/517,385 filed on Jun. 9, 2017, and the benefit of Taiwan Patent Application Serial No. 106218102 filed on Dec. 6, 2017. The entirety of each said Application is incorporated herein by reference.

BACKGROUND OF THE INVENTION

1. Field of the Invention

The present invention relates to a supporting frame for holding a display device. More particularly, the present invention relates to a supporting frame having a cam to deform an elastic body into various levels.

2. Description of Related Art

Disclosed in U.S. Pat. No. 7,252,277 is a conventional supporting frame having a proximal link, a distal link, a first strut, a second strut, a spring and a roller. The first strut and the second strut are pivoted on the proximal link and the distal link respectively so that the proximal link, the distal link, the first strut and the second strut integrally form a four-bar linkage. The first strut has a tube slot ("lumen" in U.S. Pat. No. 7,252,277) for the spring and the roller being disposed therein. The roller abuts against the proximal link. When the first strut and the second strut rotate with respect to the proximal link respectively, the roller rolls on a surface of the proximal link to deform the spring correspondingly so that various supporting power is generated when the supporting frame is moving up and down.

However, the disadvantage of the conventional supporting frame is that the interior of the supporting frame must form the tube slot for receiving the spring, the roller and a fix structure which is provided for fixing the spring and the roller in the tube slot. Therefore, the structure of the second strut is complicated, the assembly process of the second strut is difficult, and volume of the second strut is bulky.

Accordingly, the present invention provides a supporting frame with a novel structure which is highly required and has potential in the industry.

SUMMARY OF THE INVENTION

The object of the present invention is to provide a supporting frame comprising a cam and a spring being disposed near a base so that the structure of the cantilever arm can be simplified and the supporting frame of the present invention is also adapted to support the display device.

To achieve the abovementioned objects, the present invention discloses a supporting frame for holding a display device. The supporting frame comprises a base, a shaft, a cantilever arm, at least one cam, an elastic module and a mounting unit. The shaft has a shaft head and a shaft body being formed with the shaft head wherein the shaft body is disposed on the base. The cantilever arm has a first end and a second end opposite to the first end. The cantilever arm is pivoted on the shaft head and is able to rotate between a lowest position and a highest position. The cam is formed on the first end of the cantilever arm. The elastic module has an elastic body being sleeved on the shaft for providing an elastic force to the cam. The mounting unit holds the display device and is pivoted with the second end of the cantilever arm. When the cantilever arm rotates with respect to the shaft head for the cam rotating simultaneously so as to deform the elastic module into various levels, the display device is able to stop at any height between the highest position and the lowest position.

The elastic module further comprises an abutting piece having a tubular body and a head portion connecting to the tubular body, wherein the tubular body is slidably sleeved on the shaft, and the head portion of the abutting piece contacts with the elastic body and the cam.

When the cantilever arm rotates from the highest position to the lowest position so that the cam rotates to push the abutting piece to slide on the shaft, the head portion of the abutting piece presses the elastic body.

The base has a bearing surface, and the shaft is disposed on the bearing surface and extends along a first direction wherein the first direction is parallel to the normal direction of the bearing surface.

The supporting frame further includes a connecting rod having a third end and a fourth end opposite to the third end, wherein the third end is pivoted with the shaft head on a second direction, and the fourth end is pivoted with a pivot rod of the mounting unit so that the shaft head, the cantilever arm, the connecting rod and the pivot rod are integrally configured to a four-bar linkage.

In one embodiment, the number of the at least one cam is two, and the cams are formed on the first end and spaced apart from each other. The shaft is located between the cams to be pivoted with the first end. Moreover, the cams extend out of the four-bar linkage.

The elastic module further has an adjusting button being sleeved on the shaft, and the adjusting button is located between the elastic body and the base to abut against an end of the elastic body. The adjusting button is adapted to move to a position to adjust a pre-compression of the elastic body.

The mounting unit has a plate and the pivot rod connects to the plate, the plate holds the display device, and the second end is pivoted with the pivot rod.

In another embodiment, the base has a bearing surface and a projection, wherein the projection is disposed on the bearing surface and extends along a first direction, and the shaft is disposed on the projection and extends along a third direction, wherein the first direction is parallel to the normal direction of the bearing surface and the third direction is perpendicular to the normal direction of the bearing surface.

The cams are formed on the first end of the cantilever arm integrally.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENT

Figure 1:
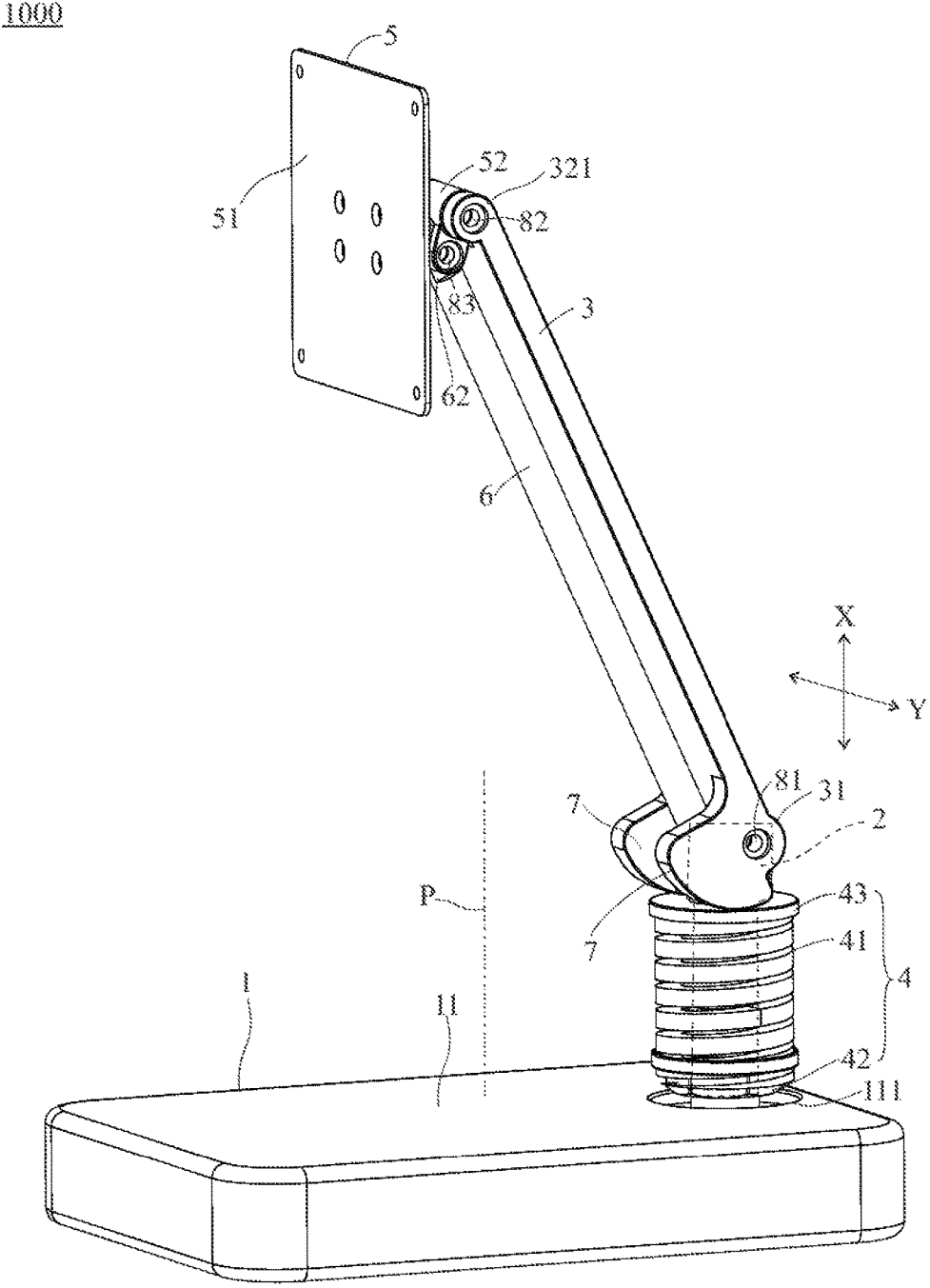
FIG. 1 is a perspective view of the supporting frame of the first embodiment of the present invention.
Figure 2:
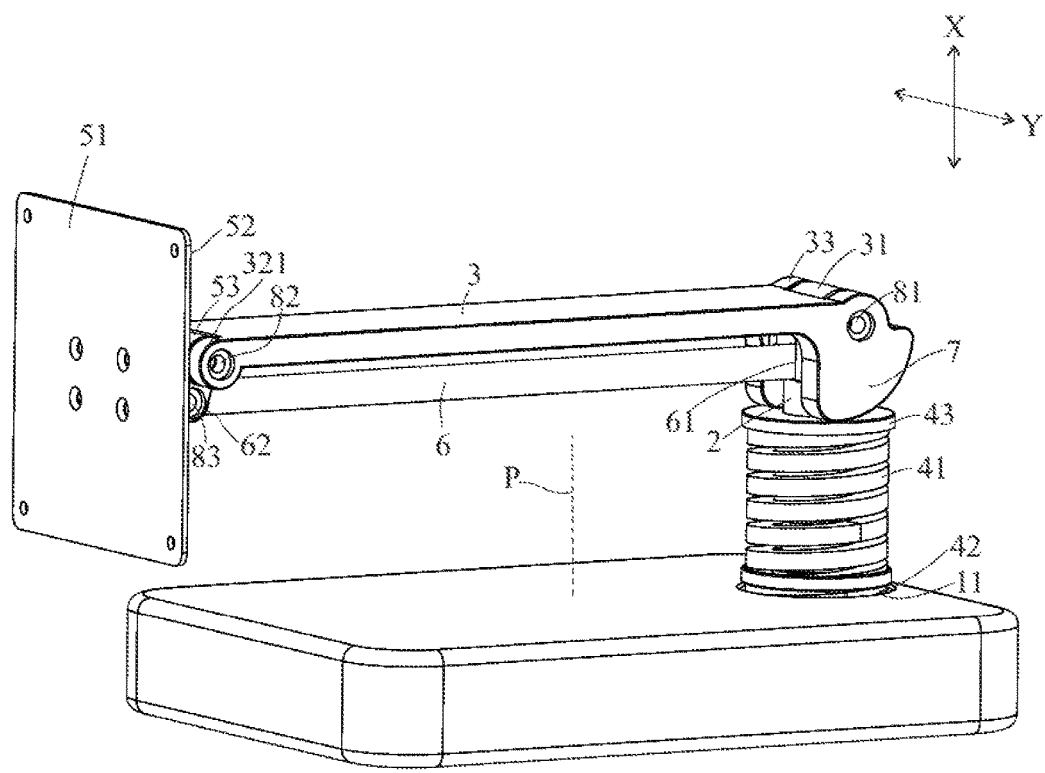
FIG. 2 is another perspective view of the supporting frame of the first embodiment of the present invention.
Figure 3:
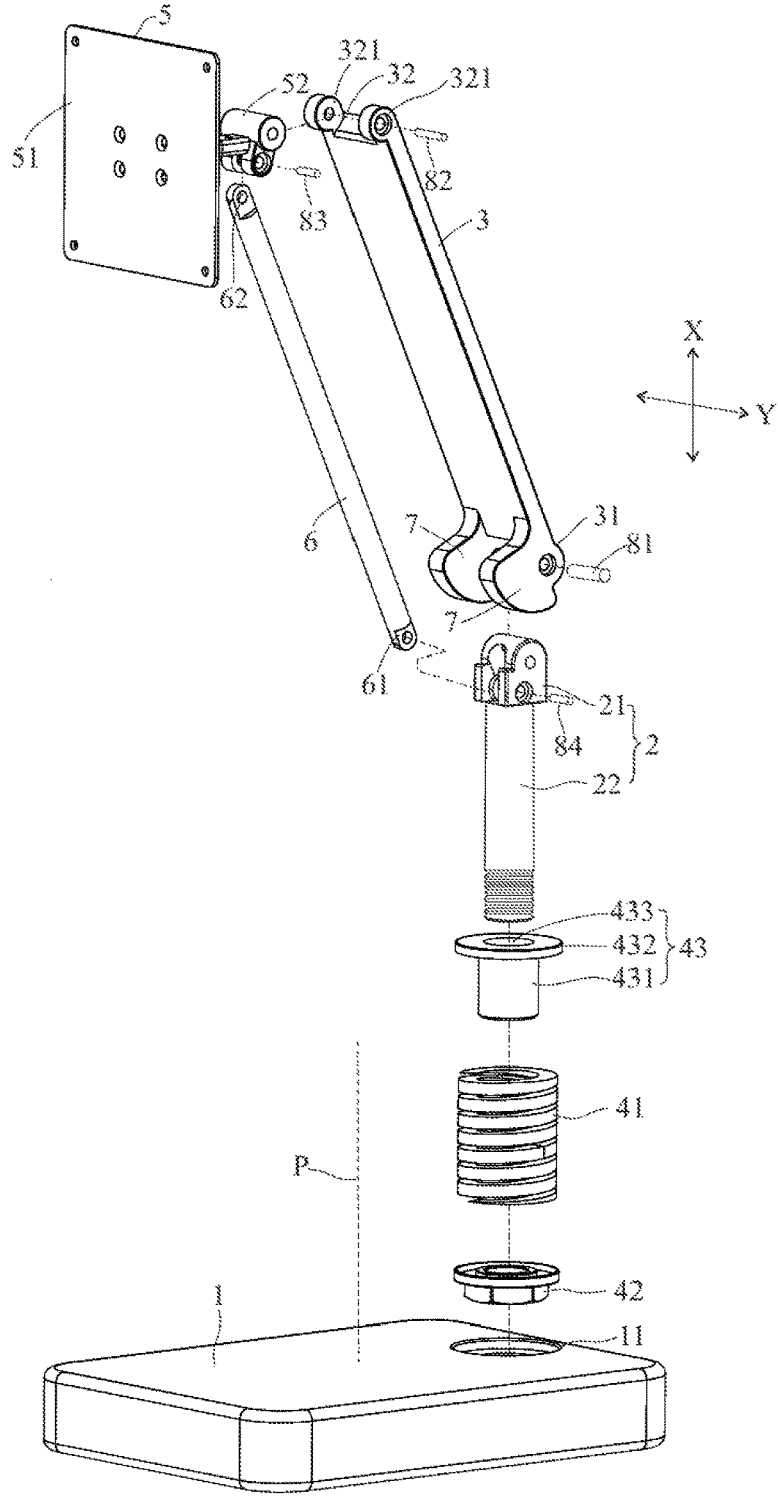
FIG. 3 is an exploded view of the supporting frame of the first embodiment of the present invention.

Please refer to FIG. 1, FIG. 2 and FIG. 3, a supporting frame 1000 of a first embodiment of the present invention comprises a base 1, a shaft 2, a cantilever arm 3, an elastic module 4, a mounting unit 5, a connecting rod 6, two cams 7, a first axle bar 81, a second axle bar 82, a third axle bar 83 and a fourth axle bar 84. The shaft 2 and the cantilever arm 3 are pivoted together through the first axle bar 81. The cantilever arm 3 and the mounting unit 5 are pivoted together through the second axle bar 82. The mounting unit 5 and the connecting rod 6 are pivoted together through the third axle bar 83. The connecting rod 6 and the shaft 2 are pivoted together through the fourth axle bar 84. In addition, the elastic module 4 has an elastic body 41, an adjusting button 42 and an abutting piece 43. The detailed structure of each element and the relationship between the elements are further described herein below.

In practice, the base 1 is plate-like and is adapted to be disposed on a desktop. The base 1 includes a bearing surface 11 having a fastening aperture 111 formed thereon. The base 1 is further internally threaded in the fastening aperture 111 (not shown in the figures due to the viewing angle). The shaft 2 has a shaft head 21 and a shaft body 22. A lower end of the shaft body 22 (that is, the end away from the shaft head 21) is threaded. The shaft body 22 is screwed with the fastening aperture 111 through the threads, and the shaft body 22 extends along a first direction X which is parallel to a normal direction P of the bearing surface 11. That is to say, after being screwed with the fastening aperture 111, the shaft body 22 is upright with respect to the bearing surface 11. The shaft head 21 of the shaft 2 is formed on an upper end of the shaft body 22 and away from the base 1. The abutting piece 43, the elastic body 41 and the adjusting button 42 are sleeved on the shaft body 22 in sequence along the first direction X. In another words, the abutting piece 43, the elastic body 41 and the adjusting button 42 are sleeved on the shaft body 22 with a top-down arrangement.

The abutting piece 43 has a tubular body 431, a head portion 432 connecting to the tubular body 431 and a hole 433 passing through the tubular body 431 and the head portion 432. The abutting piece 43 slidably sleeves on the shaft 2 through the hole 433, and the elastic body 41 sleeves on the shaft 2 and the tubular body 431. Moreover, the diameter of the head portion 432 of the abutting piece 43 is greater than the diameter of the tubular body 431 so that the head portion 432 of the abutting piece 43 contacts with an end of the elastic body 4.

The adjusting button 42 sleeves on the shaft body 22 of the shaft 2. In the present embodiment, the adjusting button 42 is screwed with the other portion of the lower end of the shaft body 22 (that is to say, after the shaft body 22 screws in the base 1, the rest of the threaded portion of the lower end of the shaft body 22 is provided for the adjusting button 42 to be screwed thereon). Thereby, the adjusting button 42 is adapted to move to different positions on the shaft 2 along the first direction X so as to adjust a pre-compression of the elastic body 41.

The cantilever arm 3 has a first end 31 and a second end 32 opposite to the first end 31. The cams 7 are formed on the first end 31. Unlike the strut has a roller disposed therein so that structure of the conventional supporting frame is complicated and volume of the conventional supporting frame is bulky, in the present invention, the cantilever arm 3 is plate-like and uncomplicated. The cams 7 are formed on the first end 31 integrally so that the structure of the cantilever arm 3 is compact. The first axle bar 81 extends along a second direction Y which is perpendicular to the first direction X. The two cams 7 are formed on the first end 31 and spaced apart with each other. The shaft head 21 of the shaft 2 is located between the cams 7, so that the cams 7 abut against the head portion 432 of the abutting piece 43. Therefore, the elastic body 41 abuts against the head portion 432 of the abutting piece 43 for providing an elastic force to the cams 7. In the present embodiment, the elastic body 41 is a compression spring. However, the elastic body in another embodiment can be any kind of spring.

The connecting rod 6 has a third end 61 and a fourth end 62 opposite to the third end 61. The mounting unit 5 has a (VESA) plate 51 and a pivot rod 52 connecting to the plate 51. As a display device (not shown) attaches on the plate 51, the display device and the pivot rod 52 are located on the opposite surfaces of the plate 51 respectively. The pivot rod 52 of the mounting unit 5 is pivoted with the second end 32 of the cantilever arm 3 through the second axle bar 82. The pivot rod 52 of the mounting unit 5 is also pivoted with the fourth end 62 of the connecting rod 6 through the third axle bar 83. The third end 61 of the connecting rod 6 is pivoted with the shaft 2 through the fourth axle bar 84. The first axle bar 81, the second axle bar 82, the third axle bar 83 and the fourth axle bar 84 all extend along the second direction Y so as to be parallel and non-overlapping to each other. Thereby, the shaft head 21 of the shaft 2, the cantilever arm 3, the connecting rod 6 and the pivot rod 52 integrally form a four-bar linkage, and the cams 7 extend out of the four-bar linkage. The shaft head 21, the cantilever arm 3, the connecting rod 6 and the pivot rod 52 are having compact configurations (plate-like or cylindrical) to connect to each other. The four-bar linkage is able to connect with the cams 7 which are located on peripheral of the four-bar linkage to rotate simultaneously so as to deform the elastic module 41 into various levels.

When the display device is mounted on the mounting unit 5 and locates at the highest position (as shown in FIG. 1), a torque generated by weight of the display device (ignoring other effects, such as that induced by the cantilever arm 3) and a torque generated by the elastic force provided by the elastic body 41 are balanced. When the display device and the mounting unit 5 move toward the base 1 along the first direction X to the lowest position (as shown in FIG. 2), the first end 31 of the cantilever arm 3 and the third end 61 of the connecting rod 6 both rotate with respect to the shaft 2, so that the torque generated by the weight of the display device is increased (because of increasing effective moment arms). On the other hand, when the first end 31 of the cantilever arm 3 rotates, it also causes the cams 7 to rotate simultaneously. Further, as the cams 7 rotate, they push the abutting piece 43 to move on the shaft 2 along the first direction X and toward the base 1. Because the shaft portion 432 of the abutting piece 43 presses the elastic body 41, the elastic force of the elastic body 41 is thus synchronously increasing during the above-mentioned rotating process of the cams 7. As a consequence, the torque generated by the elastic body 41 can always balance with the torque generated by the weight of the display device at any position. Thus, the display device is adapted to stop at any height. In addition, during the above-mentioned moving process, the pivot rod 52 also rotates with respect to the second end 32 of the cantilever arm 3 and the fourth end 62 of the connecting rod 6 so that a tilt angle (that is, the view angle of the display device) of the plate 51 of the mounting unit 5 does not change.

It should be noted that even though the connecting rod 6, the third axle bar 83 and the fourth axle bar 84 are removed, and merely the cantilever arm 3 is retained in another embodiment, the supporting frame is still able to hold the display device and let the display device stop at any height. Furthermore, the number of the cams 7 is not limited in the present invention.

Figure 4:
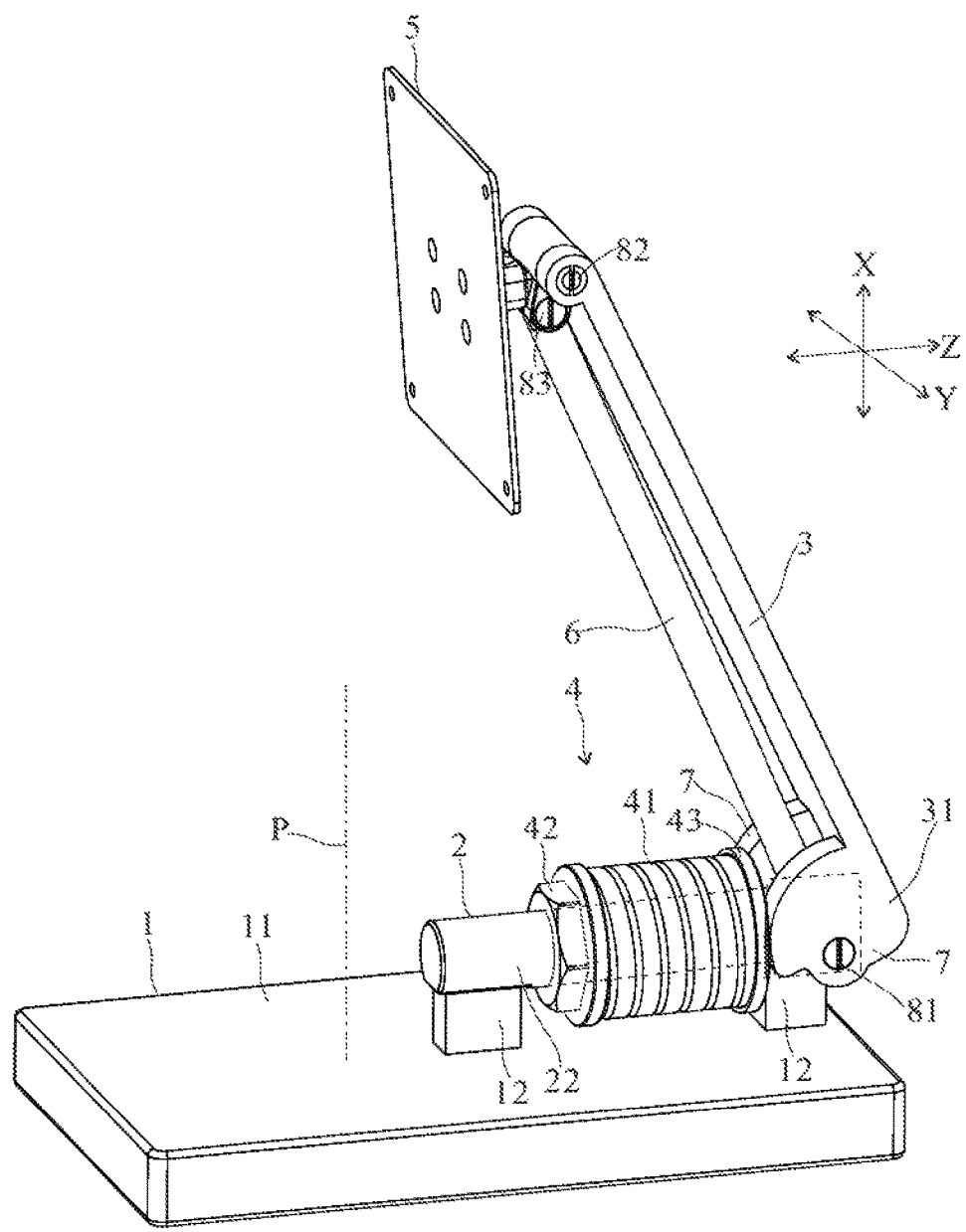
FIG. 4 is a perspective view of the supporting frame of the second embodiment of the present invention.
Figure 5:
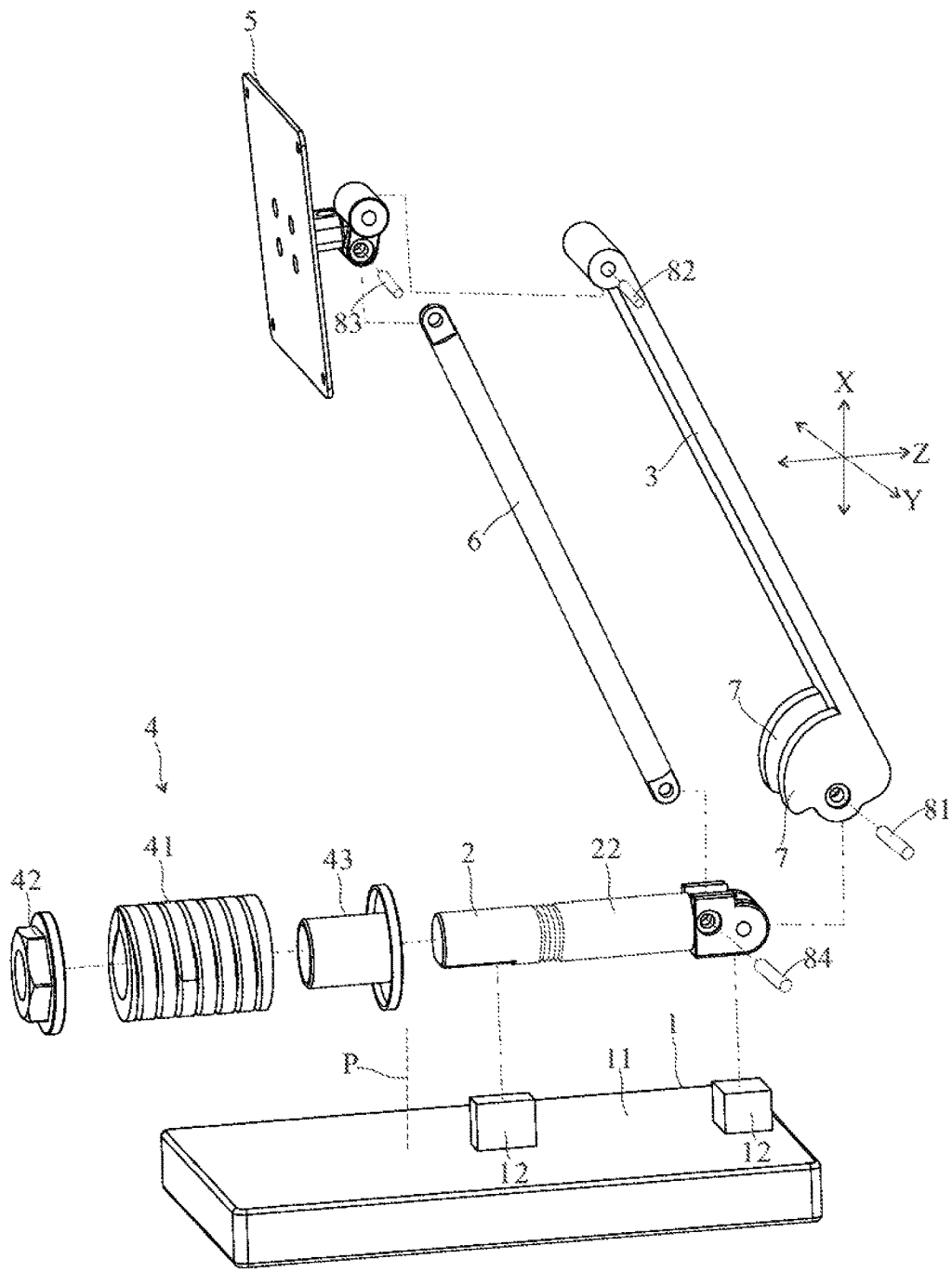
FIG. 5 is an exploded view of the supporting frame of the second embodiment of the present invention.

The second embodiment of the supporting frame is shown in FIG. 4 and FIG. 5. Similar to the first embodiment, the supporting frame 2000 of the second embodiment has a base 1, a shaft 2, a cantilever arm 3, an elastic module 4, a mounting unit 5, a connecting rod 6, two cams 7, a first axle bar 81, a second axle bar 82, a third axle bar 83 and a fourth axle bar 84. The shaft head of the shaft 2, the cantilever arm 3, the connecting rod 6 and the mounting unit 5 are also adapted to configure to a four-bar linkage.

In the present embodiment, the base 1 is plate-like and is adapted to be disposed on a desktop in practice. One of the differences between the present embodiment and the first embodiment is that the shaft 2 is parallel to the base 1 and disposed on the base 1. In more detail, the base 1 has a bearing surface 11 and a plurality of projections 12. The projections 12 extend along the first direction X and spaced apart from each other and are disposed on the bearing surface 11. The shaft body 21 of the shaft 2 extends along the third direction Z and is disposed on the projections 12. The first direction X is parallel to the normal direction P of the bearing surface 11, and the third direction Z is perpendicular to the normal direction P of the bearing surface 11. That is to say, when the shaft 2 is disposed on the projections 12, the shaft 2 is parallel to and spaced apart from the bearing surface 11 and be disposed on the projections 12.

Similarly, the elastic module 4 has an elastic body 41, an adjusting button 42 and an abutting piece 43. The abutting piece 43, the elastic body 41, and the adjusting button 42 are sleeved on the shaft body 22 in sequence along the third direction Z. That is to say, in view of FIG. 4, the abutting piece 43, the elastic body 41 and the adjusting button 42 are sleeved on the shaft body 22 from right to left. In the present embodiment, the shaft body 22 is fixed to the projections 12 on the third direction Z. The shaft body 22 of the present embodiment is threaded only for the adjusting button 42 to be screwed thereon. Thereby, the adjusting button 42 is adapted to move to a position on the shaft 2 along the third direction Z to adjust a pre-compression of the elastic body 41.

The cams 7 are formed on the first end 31. Another difference between the present embodiment and the first embodiment is that the elastic body 41 of the present embodiment is located at a side of the cams 7 (a right side in FIGS. 4 and 5) for continuously providing an elastic force to the cams 7 (due to that the cams 7 abut against the head portion of the abutting piece 43). The cantilever arm 3 rotates around the first shaft 81 (the pivot point where the shaft 2 is pivoted with the cantilever arm 3) on the second direction Y with respect to the base 1 to cause the cams 7 to rotate around the first shaft 81. Thereby, the abutting piece 43 is pushed by the cams 7 on the shaft 2 along the third direction Z so that the head portion of the abutting piece 43 increasingly compresses the elastic body 41, and thus the elastic force of the elastic body is increasing. As a result, the torques generated by the weight of the display device and by the elastic body 41 increase synchronously and remain balanced. The display device is therefore able to stop at any height.

In conclusion, in the present invention, the cams are disposed on an end of the cantilever arm, an angle of the cams with respect to the first end of the cantilever arm is able to be adjusted, and the elastic module is arranged on the cams, under the cams or beside the cams corresponding to the angle of the cams. In addition, the elastic body is disposed between the cams and the base. According to the above mentioned descriptions, the cantilever arm is adapted to have a supporting function, and configuration of the cantilever arm is simple. The tube slot of the conventional supporting frame is able to be removed. Assembly time of the supporting frame of the present invention is able to be shortened.

Although the present invention has been explained in relation to its preferred embodiment, it is to be understood that many other possible modifications and variations can be made without departing from the spirit and scope of the invention as hereinafter claimed.

What is claimed is:

1. A supporting frame for supporting a display device, the supporting frame comprising:
   a base;
   a shaft having a shaft head and a shaft body being formed with the shaft head, wherein the shaft body is disposed on the base;
   a cantilever arm having a first end and a second end opposite to the first end, the cantilever arm being pivoted on the shaft head and being able to rotate between a lowest position and a highest position;
   at least one cam being formed on the first end of the cantilever arm;
   an elastic module having an elastic body, the elastic body being sleeved on the shaft for providing an elastic force to the cam; and
   a mounting unit holding the display device and being pivoted with the second end of the cantilever arm;
   wherein when the cantilever arm rotates with respect to the shaft head to cause the cam rotating simultaneously so as to deform the elastic module into various levels, the display device is able to stop at any height between the highest position and the lowest position.

2. The supporting frame as claimed in claim 1, wherein the elastic module further comprising an abutting piece having a tubular body and a head portion connecting to the tubular body, wherein the tubular body is slidably sleeved on the shaft, and the head portion of the abutting piece contacts with the elastic body and the cam.

3. The supporting frame as claimed in claim 2, wherein when the cantilever arm rotates from the highest position to the lowest position so that the cam rotates to push the abutting piece to slide on the shaft, the head portion of the abutting piece presses the elastic body.

4. The supporting frame as claimed in claim 3, wherein the base has a bearing surface, and the shaft is disposed on the bearing surface and extends along a first direction wherein the first direction is parallel to a normal direction of the bearing surface.

5. The supporting frame as claimed in claim 4, wherein the supporting frame further includes a connecting rod having a third end and a fourth end opposite to the third end, wherein the third end is pivoted with the shaft head on a second direction, and the fourth end is pivoted with a pivot rod of the mounting unit so that the shaft head, the cantilever arm, the connecting rod and the pivot rod are integrally configured to a four-bar linkage.

6. The supporting frame as claimed in claim 5, wherein the number of the at least one cam is two, and the cams are formed on the first end and spaced apart from each other, wherein the shaft is located between the cams to be pivoted with the first end.

7. The supporting frame as claimed in claim 6, wherein the cams extend out of the four-bar linkage.

8. The supporting frame as claimed in claim 1, wherein the elastic module further has an adjusting button being sleeved on the shaft, the adjusting button is located between the elastic body and the base to abut against an end of the elastic body so that the adjusting button is adapted to move to a position to adjust a pre-compression of the elastic body.

9. The supporting frame as claimed in claim 5, wherein the mounting unit has a plate, and the pivot rod connects to the plate, the plate holds the display device, and the second end is pivoted with the pivot rod.

10. The supporting frame as claimed in claim 3, wherein the base has a bearing surface and a projection, wherein the projection is disposed on the bearing surface and extends along a first direction, and the shaft is disposed on the projection and extends along a third direction, wherein the first direction is parallel to a normal direction of the bearing surface and the third direction is perpendicular to the normal direction of the bearing surface.

11. The supporting frame as claimed in claim 1, wherein the cams are formed on the first end of the cantilever arm integrally.

\* \* \* \* \*